United States Patent [19]

Quinlan

[11] Patent Number: 6,078,949
[45] Date of Patent: Jun. 20, 2000

[54] SCHEME FOR INTERLOCKING AND TRANSFERRING INFORMATION BETWEEN DEVICES IN A COMPUTER SYSTEM

[75] Inventor: Una M. Quinlan, Dublin, Ireland

[73] Assignee: Cabletron Systems, Inc., Rochester, N.H.

[21] Appl. No.: 08/294,765

[22] Filed: Aug. 23, 1994

Related U.S. Application Data

[63] Continuation of application No. 07/724,402, Jun. 28, 1991, abandoned.

[51] Int. Cl.[7] .................................................. G06F 15/167
[52] U.S. Cl. ............................................................. 709/215
[58] Field of Search .................................. 395/800, 425, 395/275; 709/213, 215

[56] References Cited

U.S. PATENT DOCUMENTS

| 4,402,046 | 8/1983  | Cox et al. ............................... | 395/200   |
|-----------|---------|---------------------------------------------|-----------|
| 4,467,414 | 8/1984  | Akagi et al. ............................ | 395/250   |
| 4,574,362 | 3/1986  | Spindel et al. ......................... | 395/325   |
| 4,761,763 | 8/1988  | Hicks ......................................... | 395/325   |
| 4,779,089 | 10/1988 | Theus ..................................... | 340/825.5 |
| 4,794,516 | 12/1988 | Auerbach et al. .................... | 395/325   |
| 4,852,127 | 7/1989  | Fraser et al. ............................ | 375/94    |
| 4,897,782 | 1/1990  | Bennett et al. ........................ | 395/600   |
| 4,975,833 | 12/1990 | Jinzaki .................................... | 395/425   |
| 5,077,658 | 12/1991 | Bendert et al. ........................ | 395/600   |
| 5,175,832 | 12/1992 | Keryvel et al. ........................ | 395/425   |
| 5,214,769 | 5/1993  | Uchida et al. .......................... | 395/425   |
| 5,249,301 | 9/1993  | Keryvel et al. ........................ | 395/800   |

FOREIGN PATENT DOCUMENTS 0077008  4/1983  European Pat. Off. ........ G06F 15/16

*Primary Examiner*—John A. Follansbee
*Attorney, Agent, or Firm*—Wolf, Greenfield & Sacks, P.C.

[57] ABSTRACT

A scheme for interlocking two devices in a computer system for the performance of request/response transfers between the two devices. The scheme provides a request/response memory including a plurality of entries, each of the entries having a request storage memory space for storing a request and a response storage memory space for storing a corresponding response. Each request storage memory space and response storage memory space includes a preselected area for the storage of ownership information relating to the request/response pair stored in the respective entry so that ownership information can be read and written in the same read/write operations utilized in respect of the corresponding request/response pair.

32 Claims, 5 Drawing Sheets

REQ_WIP = REQUEST-WRITE-IN-PROGRESS
FBUS_AS = FUTUREBUS ADDRESS STROBE
LWO_RING = ADDRESS IN RRSRAM OF (RING AND RING ENTRY)
FBUS_RING = RING ENTRY BEING ACCESSED BY FUTUREBUS

SCHEME FOR INTERLOCKING AND TRANSFERRING INFORMATION BETWEEN DEVICES IN A COMPUTER SYSTEM

This is a continuation of application Ser. No. 07/724,402, filed Jun. 28, 1991, entitled A SCHEME FOR INTERLOCKING DEVICES IN A COMPUTER SYSTEM now abandoned.

FIELD OF THE INVENTION

The present invention is directed to a method and apparatus for transferring information between devices of a computer system and, more particularly, to a scheme for interlocking devices in the system for the transfer of request and response information between the devices.

BACKGROUND OF THE INVENTION

Modern computer systems often comprise a plurality of processors coupled to one another and to a shared resource by a bus. The shared resource may comprise, for example, a database containing information required by the processors in the execution of various software modules running on the processors. The database can be arranged as a lookup database service that is made available to all of the processors of the system.

By way of example, each processor may receive input data that includes identification information relating to an entity and the software module running on the processor may require the processing of data relating to the entity identified in the input data. The lookup database service can store the relevant data for each entity that can be identified in input data.

Accordingly, the processor can read the relevant information for an entity identified in a particular input of data from the shared database service and then proceed to process the relevant information. The identification information for a particular data input is transmitted to the database service as a "request" and the relevant information corresponding to the identification information of the request is returned to the processor as a corresponding "response".

In any scheme for transferring requests and responses between two devices, it is necessary to interlock the devices so as to make certain that each request is property identified to the responding device as a valid request. In addition, each response must be identified to the requesting device as a valid response. The validity of each request and its corresponding response is typically indicated in "ownership" information associated with each request, response pair.

When the ownership information indicates that the responding device "owns" a request, this represents a request written by a requesting device and yet to be processed for a response. Thus, the responding device will know that the request is to be used for lookup of a corresponding response. When the ownership information indicates that a response is owned by the requesting device, this represents a response returned by the responding device in respect of the corresponding request. Accordingly, the requesting device will know that the response should be used in the processing of the input data relating to that request. In this manner, requests and responses can be efficiently transferred between two devices without redundant processing of requests and with a positive indication of correspondence between each response and its respective request.

In known systems, a request/response memory is used as a central storage area for all requests and responses. The requesting device writes each request into an appropriate location in the request/response memory and the responding device polls the request/response memory for requests to process.

An interlock between the requesting and responding devices typically comprises a separate memory space used to store the ownership information relating to the request, response pairs. The requesting device must write the ownership information for each request in a preselected location of the ownership information memory space after it writes the respective request, to indicate that the request is valid for processing. During a polling operation, the responding device reads each request from its location in the request/response memory and also reads the ownership information for that request from the preselected location of the separate ownership information memory space to verify that the respective request is valid for processing.

When the responding device returns a response to the request/response memory, it must also write the appropriate ownership information in the separate ownership information memory location for the request, response pair so that the requesting device is provided with a positive indication that the response is valid for use in the processing of the input data relating to the respective request.

As should be understood, the known interlock scheme described above requires a total of eight read/write operations to complete a request/response transfer between two devices. The requesting device must write the request into the request/response memory and also write the corresponding ownership information into the ownership information memory space. The responding device must read each request from the request/response memory, read the corresponding ownership information from the ownership information memory space, write the corresponding response into the request/response memory and write the response ownership information into the ownership information memory space. Finally, the requesting device must read the response from the request/response memory and read the response ownership information from the ownership information memory space.

When the computer system is implemented as a bus based system with, for example, a plurality of requesting device coupled over the bus to each of the request/response memory and the ownership information memory space, each of the four read/write operations perfomed by each requesting device during a request/response transfer may require a bus transaction for completion of the information transfer. This can result in an inordinate amount of bus traffic and an unacceptable level of inefficiency in system operation, particularly in systems that perform a large amount of data recessing involving request/response transfers.

SUMMARY OF THE INVENTION

The present invention provides an interlocking scheme that reduces the total number of read/write operations required to complete a request/response transfer. Thus, a bus based system, implementing the interlocking scheme according to the present invention, will be able to perform a large amount of data processing involving request/response transfers with a high level of system efficiency. Generally, the interlocking scheme according to the present invention merges each ownership information storage location into the location of the request/response memory utilized to store the corresponding request/response pair. In this manner, the requesting and responding devices can read or write the ownership information at the same time and during the same read/write operation used to read or write the respective request/response pair. Accordingly, the overhead imposed upon the bus to complete request/response transfers is reduced to provide a more efficient operation in the computer system.

DETAILED DESCRIPTION

Figure 1:
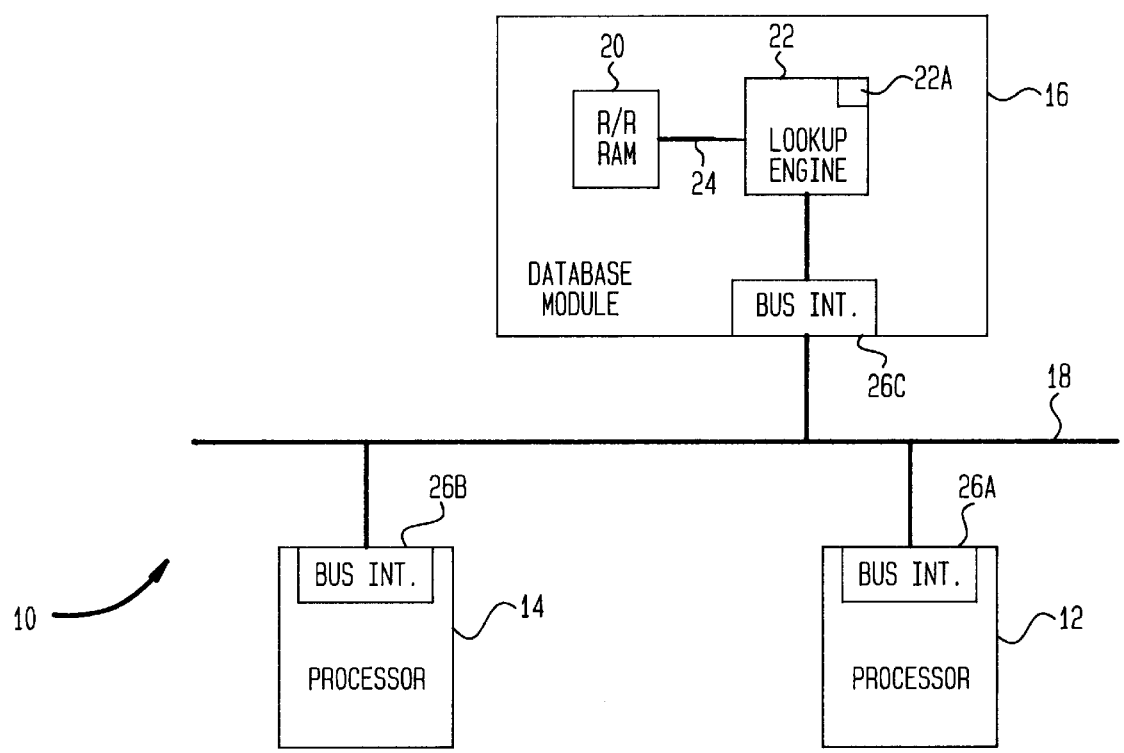
FIG. 1 is a block diagram of an exemplary computer system incorporating an interlock scheme according to the present invention.

Referring now to the drawings, and initially to FIG. 1, there is illustrated a computer system generally indicted by the reference numeral 10. The computer system comprises a plurality of processors 12, 14 and a database module 16 coupled to one another by a backplane bus 18. The database module includes a request/response RAM 20 and a database memory lookup engine 22 coupled to one another by a point-to-point coupling 24. The database memory lookup engine 22 further includes a database 22A containing a plurality of entries for storage of data.

Each of the processors 12, 14 and the database memory lookup engine 22 is provided with a backplane bus interface 26A, 26B, 26C, respectively, to control communication over the backplane bus 18. The backplane bus 18 and backplane bus interfaces 26A, 26B, 26C can be operated according to the Futurebus asynchronous backplane bus protocol standard promulgated by the IEEE (ANSE/IEEE Std. 896.1).

Each of the processors 12, 14 can obtain data from preselected ones of the entries of the database 22A through a request/response transfer with the database memory lookup engine 22 over the backplane bus 18. When a processor 12, 14 requires data from the database 22A it will arbitrate for control of the backplane bus 18 through the respective backplane bus interface 26A, 26B and, upon obtaining control of the backplane bus 18, write the request for data into a predetermined location of the request/response RAM 20, as will be described below.

The database memory lookup engine 22 polls the request/response RAM 20 for requests to process. The database memory lookup engine 22 uses each request read from he request/response RAM 20 as an index to the database 22A to locate a corresponding entry in the database 22A. The data stored in the located entry is written into the request/response RAM 20 by the database memory lookup engine 22 at a location that corresponds to the respective request, as will appear. The processor that originally wrote the respective request can again access the request/response RAM 20 via the backplane bus 18 to read the corresponding response.

Figure 2:
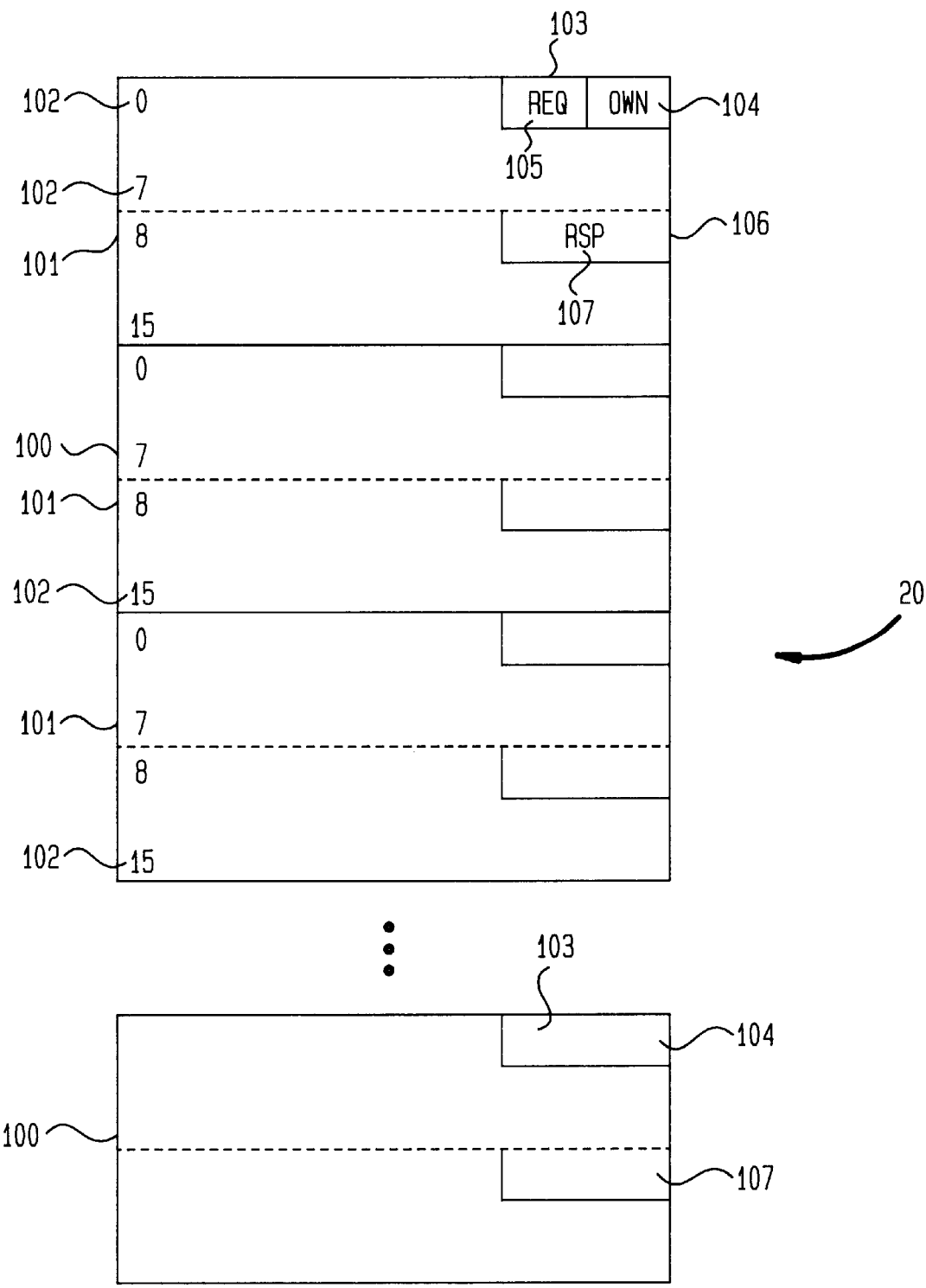
FIG. 2 illustrates a data block structure for the request/response RAM of FIG. 1.

Referring now to FIG. 2, there is illustrated in more detail a data block structure for the request/response RAM 20. The request/response RAM 20 provides an interlock mechanism between each processor 12, 14 and the database memory lookup engine 22 for an exchange of request and response information. The request/response RAM 20 is divided into a plurality of rings 100, e.g. 32 rings, with each ring 100 being dedicated to one of the processors 12, 14. Each of the processors 12, 14 may have one or more rings allocated to it depending on the data traffic expected through the processor 12, 14 so as to properly balance the servicing of requests by the database memory lookup engine 22. For example, the processor 12 may have more allocated rings 100 than the processor 14. Each ring 100 is further divided into a plurality of entries 101, as for example, 16 entries 101 per ring 100.

As illustrated in FIG. 2, each entry 101 has sufficient memory space to store 16 longwords 102, designated as 0 to 15 in each entry 101. A first set of eight longwords, 0–7, of each entry 101 is used to store a request. A second set of eight longwords, 8–15, of each entry 101 is used by the database memory lookup engine 22 to store the response corresponding to the request stored in longwords 0–7 of the respective entry 101.

Each processor 12, 14 maintains a pointer mechanism including a first pointer to indicate the location of a next entry 101 in one of its rings 100 in the request/response RAM 20 that is available to store a request. The first pointer will increment to a next location after each request is stored in the request/response RAM 20. In addition, a second pointer of the pointer mechanism indicates the location of a previously used entry 101 that should be accessed for reading of a response. The second pointer is also incremented after the processor 12, 14 reads the response.

The first and second pointers are initialized to point to the same entry location and will each continuously loop around the ring or rings allocated to the respective processor 12, 14 as they are incremented. If the first pointer loops around the ring 100 faster than the rate at which the processor 12, 14 reads responses from the request/response RAM 20, (i.e., faster than the database memory lookup engine 22 can service requests) the location pointed to by the first pointer will eventually coincide with the location pointed to by the second pointer. At that time, the processor 12, 14 will stop sending requests to the request/response RAM 20 until the second pointer has been incremented to point to another entry in the ring 100.

The database memory lookup engine 22 polls each ring 100 of the request/response RAM 20 on a round robin basis, for requests to service. The database memory lookup engine 22 reads one entry 101 of each ring 100 as it polls each ring 100 and continues polling to eventually read 11 of the entries 101.

During the exchange of requests and responses between the processors 12, 14 and the database memory lookup engine 22, it is necessary to communicate the validity of a request or a response in a particular entry 101 to the database memory lookup engine 22 or processor 12, 14, respectively. In other words, the database memory lookup engine 22 must be able to determine whether a request in an entry 101 that it polls is one that should be serviced (valid) or one that has already been serviced and thus should not be read (invalid). Similarly, a processor 12, 14 must be able to determine whether a response in an entry 101 is the response to the request that it last stored in the entry 101 (valid) or a stale response corresponding to a previous request (invalid).

Pursuant to a feature of the present invention, the interlock between the processors 12, 14 and the database memory lookup engine 22 provides for "ownership" information to be stored in dedicated bytes of each request and each response memory space of each entry 101 as an indication of the validity of the data in the respective memory space of the entry 101. Moreover, the setting and clearing of the ownership information is performed by both the processors 12, 14 and the database memory lookup engine 22 during their respective read and write operations in respect of requests and responses to minimize the total number of bus transactions required to complete the request/response transfer. This minimizes the bus transaction overhead for the transfer of a request/response pair through the computer system 10 and, therefore, further facilitates the prompt completion of the bus transactions required for the return of responses to the processors 12, 14.

Referring once again to FIG. 2, the first byte 103 of the first set of longwords 102 (longwords 0–7 of each entry 101 for storage of a request) is dedicated to store an OWN_ID bit 104 and a REQ_ID bit 105. In addition, the first byte 106 of the second set of longwords 102 (longwords 8–15 of each entry for storage of a response) is dedicated to store a RSP_ID bit 107. The OWN_ID, REQ_ID) and RSP_ID bits 104, 105, 107 together provide the ownership information necessary for an indication of the validity of data stored in the respective entry 101. Moreover, the storage of the OWN_ID and REQ_ID and RSP_ID bits at the request and the response memory spaces of each entry 101, respectively, allows for the reading and changing of ownership information within the same read/write operations for the respective request/response pair, as will appear.

Figure 3:
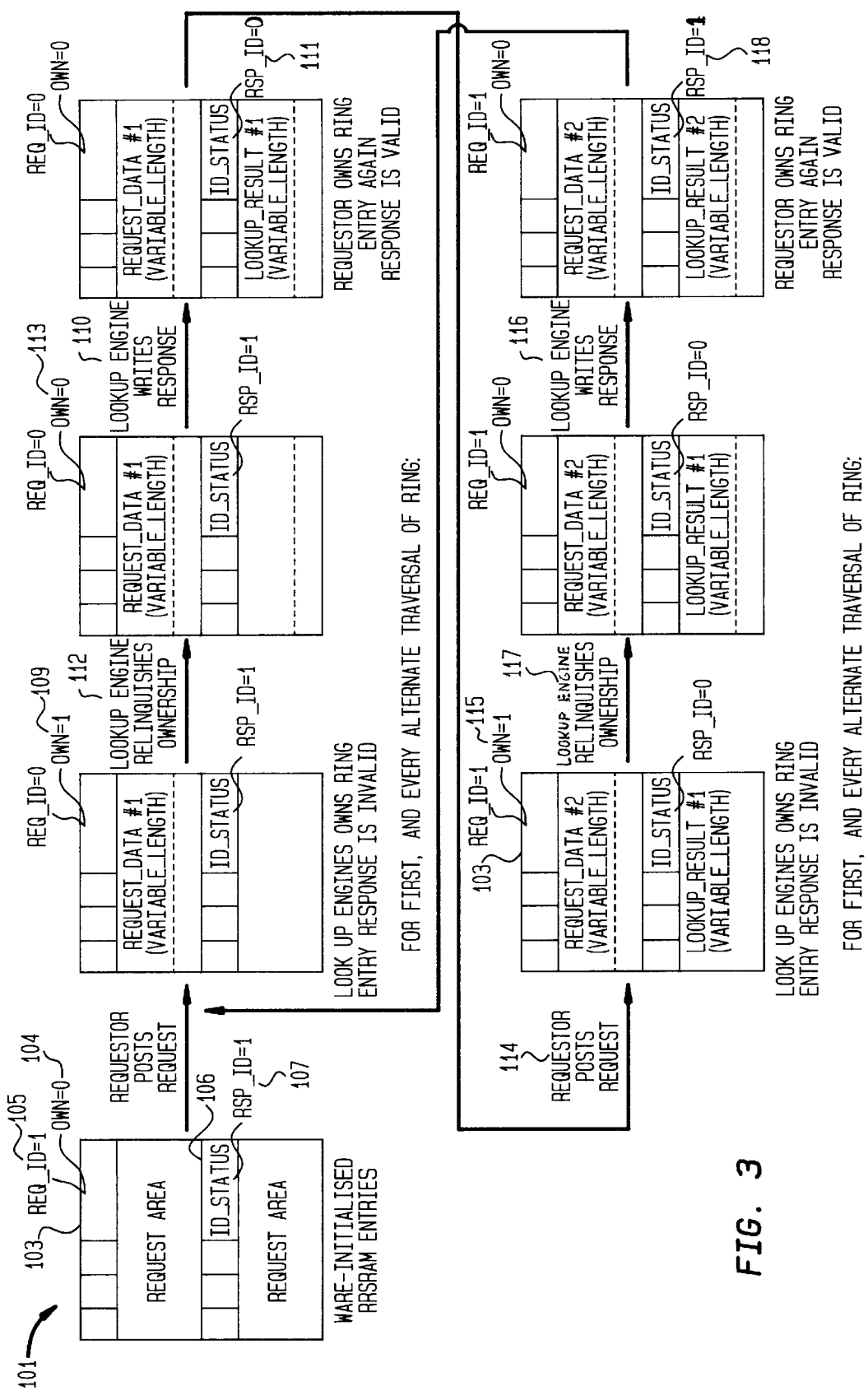
FIG. 3 is a flow diagram for reading and writing ownership information in the data block structure of FIG. 2.

Referring now to FIG. 3, there is illustrated a flow diagram for the reading and changing of ownership information by the processors 12, 14 and the database memory lookup engine 22 during their respective read and write operations in a request/response transfer for validation and verification of validation of the request and response data stored in a respective entry 101 of a ring 100. At initialization of the system, the OWN_ID bit 104 is negated and each of the REQ_ID bit 105 and RSP_ID bit 107 is asserted. In FIG. 3, the asserted state for each bit is indicated by a logical 1 and the negated state is indicated by a logical 0.

When a processor 12, 14 sends a request over the bus 18 to the request/response RAM 20, the processor 12, 14 will address the request to longwords 0–7 of the entry 101 currently pointed to by the first pointer and include a first byte in the request that asserts the OWN_ID bit 104 and negates the REQ_ID bit 105. The location of the first pointer relative to the second pointer will verify that the entry 101 is available. When the address is stable on the bus 18, the database memory lookup engine 22 will recognize a request/response RAM address and pass the request directly to the request/response RAM 20 over the cupling 24.

The re-quest will be written into the location of longwords 0–7 of the addressed entry 101 in the request/response RAM 20, including the first byte that asserts the OWN_ID bit 104 and negates the REQ_ID bit 105 (see 108, 109). At this time, the database memory lookup engine 22 owns the entry 101 (indicated by the asserted OWN_ID) bit 104) and the response currently in the entry 101 is invalid (indicated by the mismatch between the now negated REQ_ID bit 105 and the asserted RSP_ID bit 107).

The processor 12, 14 will follow the convention of asserting the OWN_ID bit and negating the REQ_ID bit during the first and every alternate traversal of the respective ring 100 when writing requests to the request/response RAM 20.

During the polling operation, the database memory lookup engine 22 will eventually read the request in the entry 101. The asserted OWN_ID bit 104 tells the database memory lookup engine 22 that it owns the request (see 109).

In order to permit the writing of requests that vary in length, each of the OWN_ID bit 104 and REQ_ID bit 105 is written into the first byte of the first longword 102 of the entry 101 so that a fixed convention for a validity indication can be followed despite the variable length of the request. The processor 12, 14 will, therefore, write the ownership information at the beginning of a write operation and then continue to write the request. The database memory lookup engine 22 must be able to determine that the OWN_ID bit 104 in the first longword 102 is associated with a request that has been completely written into the respective entry 101 (i.e., the processor 12, 14 has completed its write operation to the request/response RAM 20).

Figure 4:
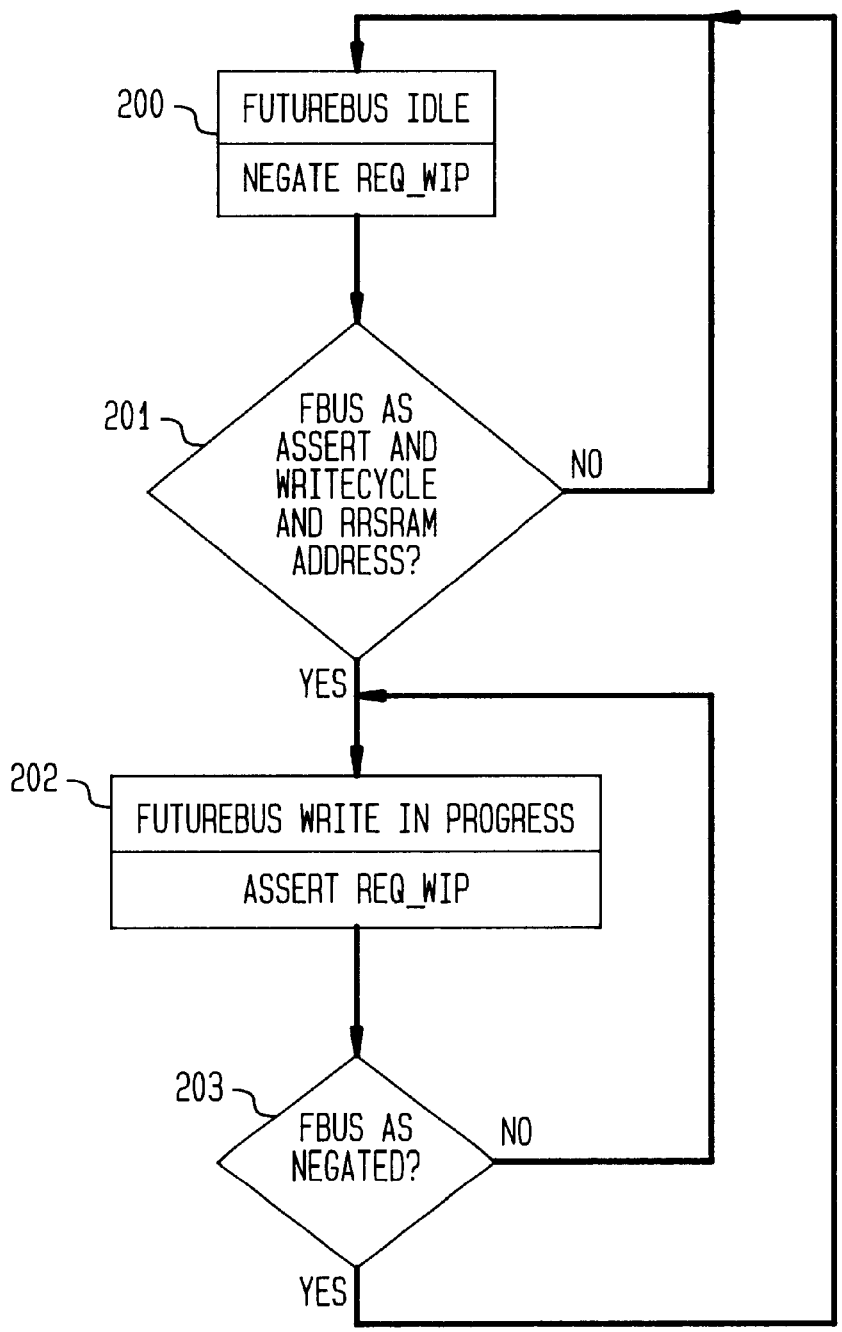
FIG. 4 is a flow diagram of the operation of the database of FIG. 1.

Referring now to FIG. 4, there is illustrated a flow diagram for a portion of the hardware operation of the database memory lookup engine 22 utilized to make certain that the write operation for a request associated with an asserted OWN_ID bit 104 has been completed. The database memory lookup engine 22 is arranged to assert an REQ_WIP signal whenever a write to the request/response RAM 20 through the bus 18 is in progress. In step 200 of the operation of the database memory lookup engine 22, the database memory lookup engine 22 initially assumes that the bus 18 is idle. In step 201, the database memory lookup engine 22 monitors the bus 18 to determine whether the AS* signal of the Futurebus asynchronous bus protocol is asserted on the bus 18, the processor 12, 14 has asserted a command for a write operation and the address placed on the bus 18 during the connection phase is for the request/response RAM 20.

If this determination is negative, the operation of the database memory lookup engine 22 loops back to step 200. However, if this determination is positive, the database memory lookup engine 22 asserts the REQ_WIP signal in step 202. The database memory lookup engine 22 will continue to monitor the bus 18 until the AS* signal is negated (step 203). Prior to the negation of the AS* signal, the database memory lookup engine 22 loops back to step 202 and continues to assert the REQ_WIP signal. Upon the negation of the AS* signal by the processor 12, 14, to indicate the disconnection phase of the respective bus transaction, the database memory lookup engine 22 loops back to step 200 and negates the REQ_WIP signal. Thus, the operation of the database memory lookup engine 22, a illustrated in FIG. 4, provides a positive indication (the REQ_WIP signal) whenever a write operation to the request/response RAM 20 is in progress.

Figure 5:
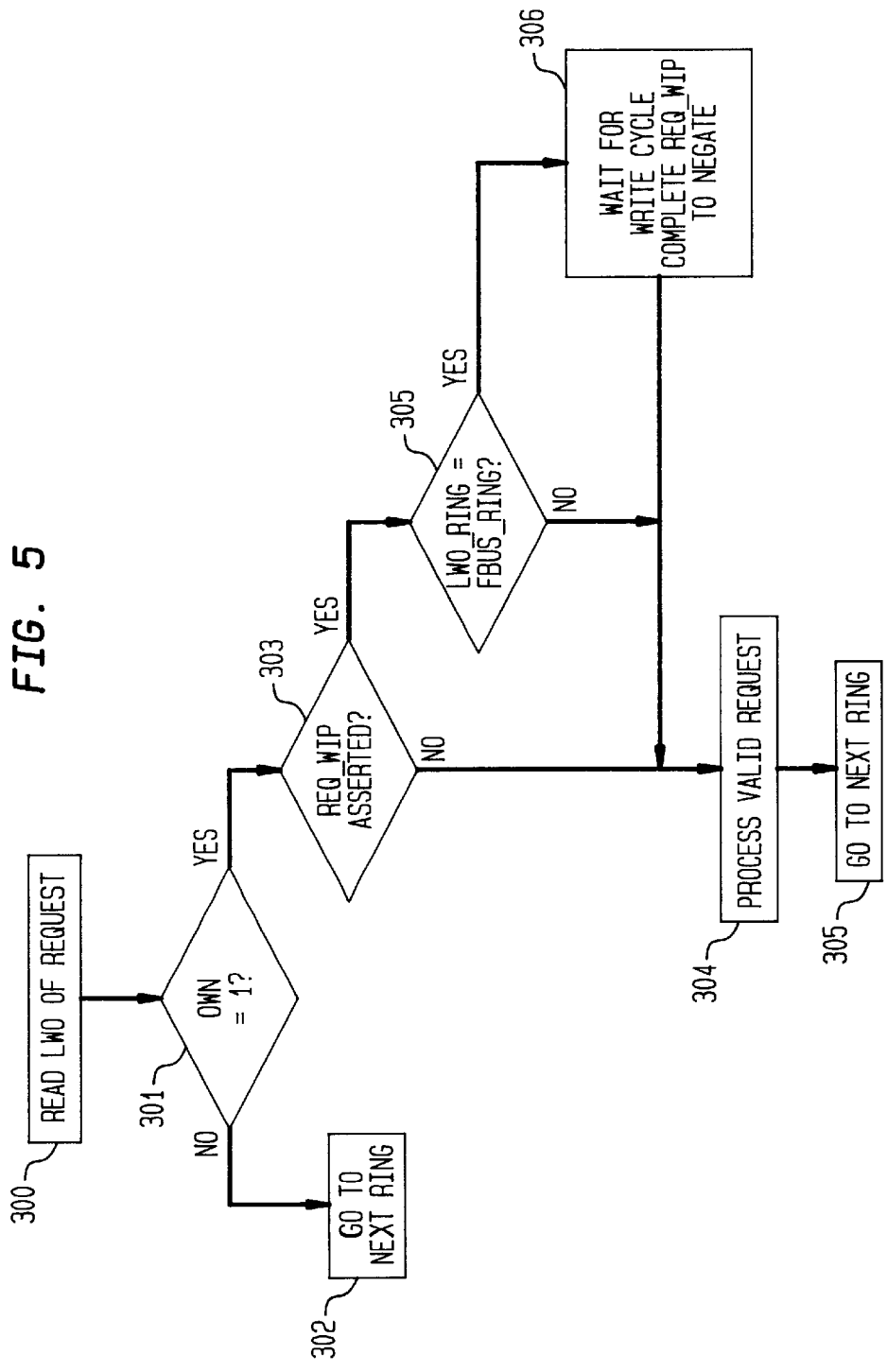
FIG. 5 is a flow diagram of the operation of the database during the reading of a request in the request/response RAM of FIG. 1.

Referring now to FIG. 5, there is illustrated a flow diagram for the operation of the database memory lookup engine 22 during the reading of a request. In step 300, the database memory lookup engine 22 reads longword 0 of the entry 101 including the OWN_ID bit 104. In step 301, the database memory lookup engine 22 determines whether the OWN_ID bit 104 is asserted. If it is not asserted, the database memory lookup engine 22 continues the polling process to a next ring 100 (step 302). However, if the OWN_ID bit 104 is set, as in the example illustrated at 109 of FIG. 3, the database memory lookup engine 22 determines whether the REQ_WIP signal is also asserted to indicate that a write of a request to the request/response RAM 20 is in progress (step 303).

If the REQ_WIP signal is not asserted, the database memory lookup engine 22 continues to process the request and then moves on to a next ring 100, according to the polling scheme (steps 304, 305).

Referring back to FIG. 3, the database memory lookup engine 22 will relinquish ownership of the entry 101 upon reading a valid request by writing a negated OWN_ID bit 104 to the first byte of longword 0, 112, 113. After the database memory lookup engine 22 services a request, it writes the corresponding response into longwords 8–15 of the entry 101 as indicated at 110. The first byte of the response, in longword 8, includes an RSP_ID bit 107 that matches the RSP_ID bit 107 written by the processor 12, 14 when it wrote the request to longwords 0–7 of the entry 101, as described above. In this instance, the RSP_ID bit 107 is negated as shown at 111.

The database memory lookup engine 22 must therefore access the request/response RAM 20 three times during the servicing of each request, once to read the request, once to negate the OWN_ID bit 104 and once to write the response, including the RSP_ID bit. However, due to the point-to-point coupling 24 between the database memory lookup engine 22 and the request/response RAM 20, there is no overhead on the bus 18.

The processor 12, 14 accesses the entry 101 during a subsequent bus transaction when the second pointer points to the entry 101. At that time, the processor accesses and reads longwords 8–15 of the entry 101 for the response and the RSP_ID bit 107. The processor 12, 14 will know that the response is valid when the RSP_ID bit 107 written by the database memory lookup engine 22 matches the REQ_ID bit written by the processor 12, 14 when it wrote the request. As shown at 109 and 111, the processor 12, 14 negated the REQ_ID bit 105 when writing the request and the database memory lookup engine 22 negated the RSP_ID bit 107 when writing the response. If the REQ_ID bit does not match the RSP_ID bit, the response is not valid (i.e. the database memory lookup engine 22 has not yet serviced the request) and the processor 12, 14 must read the response again at a later time.

In this manner, the processor 12, 14 is able to complete the request/response transfer in two bus transactions over the bus 18. During the write operation for the request, the processor 12, 14 need only access the request longwords 0–7 of the entry to write the ownership information in the OWN_ID bit 104 and the RSP_ID bit 107. During the read operation for the response, the processor 12, 14 need only access the response longwords 8–15 of the entry to determine the validity of the response through a match between the REQ_ID bit 105 that it wrote during the write request operation and the matching RSP_ID bit 107 that the processor 12, 14 reads during the second bus transaction.

As is the case with requests, each response can be of variable length. Thus, the RSP_ID bit 107 is also written into the first byte of the first longword 102 so that a fixed convention for a validity indication can be followed despite the variable length of the response. The database memory lookup engine 22 operates to hold any read for a response if it is currently writing the response to the address indicated in the read. This will insure that RSP_ID bit 107 in the first longword 102 of the response is associated with a response that has been completely written by the database memory lookup engine 22.

For a second and every alternate traversal of the ring 100 by the processor 90, the first byte 103 written by the processor 90 (114) asserts each of the OWN_ID bit 104 and the REQ_ID bit 105, as shown at 115. The REQ_ID bit 105 is asserted in the second and each alternate traversal of the ring 100 to again cause a mismatch between the REQ_ID bit 105 and the RSP_ID bit 107 since the database memory lookup engine 22 negates the RSP_ID bit 107 during the response write operation of the first and each alternate traversal of the ring 100. The write response, relinquish ownership and read response operations 116, 117 for the second and each alternate traversal is similar to the operations for the first and each alternate traversal of the ring 100, except that the database memory lookup engine 22 now asserts the RSP_ID bit 107 when writing a response, to provide a match with the asserted REQ_ID bit 105, as shown at 118.

Referring again to FIG. 5, if, during a request read operation by the database memory lookup engine 22, the REQ_WIP signal is asserted 303, the database memory lookup engine 22 compares the address of longword 0 of the entry being accessed for a request read operation with the address of the entry on the bus 18 for which a request write operation is in progress (305). If there is a mismatch, the database memory lookup engine 22 proceeds to process the request (304). However, if there is a match, the database memory lookup engine 22 waits for the write operation to complete, i.e. a negation of the REQ_WIP signal (306). Thereafter, the database memory lookup engine 22 proceeds to process the request (304)

What is claimed is:
1. A computer system, which comprises:
a first device receiving input data and generating requests, for information relating to the input data, each of a plurality of said requests includes request data and request ownership information;
a second device including an information lookup database comprising a plurality of entries, each one of the plurality of entries containing information relating to a corresponding request; and
a request/response memory coupled to each of the first and second devices to interlock the first and second devices for an exchange of information;
the first device operating to communicate to the second device, via the request/response memory, by said requests for information, each of the plurality of said requests for information, including request data and request ownership information being transmitted in a single write transaction to the request/response memory;
the second device operating to use the request data from each of the plurality of said requests as a lookup index to the lookup database for access to and retrieval of a corresponding one of the entries to generate a response including response data and response ownership information, and to communicate each response to the first device, via the request/response memory, for use by the first device in processing the input data;
the request/response memory comprising a plurality of entries, each of the entries including a request storage memory space for storing a request by the first device and a response storage memory space for storing a corresponding response by the second device, the request storage memory space for each entry being accessible to both the first and second devices;
the request storage memory space of each one of the entries including a first preselected memory location for storage of request ownership information and a second preselected memory location for storage of request data;
the response storage memory space of each one of the entries including a third preselected memory location for storage of response ownership information and a fourth preselected memory location for storage of response data;

wherein the request ownership information of the first preselected memory location indicates whether the request data stored in the respective request storage memory space by the first device is valid for use by the second device and the response ownership information of the respective third preselected memory location indicates whether the response data stored in the respective response memory space by the second device is valid for use by the first device.

2. The computer system of claim 1 wherein the first device operates to communicate each request in a single write transaction by simultaneously writing the request data and the request ownership information of the request being communicated in the request storage memory space of a preselected one of the entries, wherein the request ownership information of the request being communicated is written in the respective first preselected memory location to indicate that the corresponding request data simultaneously written in the respective second preselected memory location is valid.

3. The computer system of claim 2 wherein the second device polls and reads each request storage memory space and uses each valid request to access the information lookup database for a corresponding response, the second device writing ownership information in the respective first preselected space upon reading a request, to indicate that the corresponding request is now not valid, and storing each response in the response storage memory space of the preselected one of the entries storing the respective request, wherein storing each response includes writing ownership information in the respective third preselected memory location to indicate that the corresponding response is valid.

4. The computer system of claim 3, wherein each first preselected space stores ownership information comprising OWN_ID information and REQ_ID information;
the OWN_ID information representing one of a set state or a clear state, the set state indicating to the second device that a request stored in the respective request memory space is valid for use by the second device and the clear state indicating to the second device that a request stored in the respective request memory space is not valid for use by the second device;
the REQ_ID information representing one of a set state or a clear state, the state of the REQ_ID information being used by the second device to determine ownership information for writing in the third preselected space.

5. The computer system of claim 3, wherein the second device monitors the writing of requests by the first device and asserts a REQ_WIP signal when the first device is writing a request to the request/response memory.

6. The computer system of claim 1, further comprising a plurality of additional devices, each adapted to receive input data and to generate requests for information relating to the input data and being coupled to the request/response memory.

7. The computer system of claim 6, wherein the entries of the request/response memory are grouped into a preselected number of rings; with each one of the entries being grouped into one of the rings and each ring being dedicated for use by one of the first device and the plurality of additional devices.

8. The computer system of claim 1, wherein the request/response memory comprises a RAM.

9. A computer system, which comprises:
a first device which receives input data and generates requests for information relating to the input data, each request including request data and request ownership information;

a second device including an information lookup database comprising a plurality of entries, each one of the plurality of entries containing information relating to a corresponding request; and a request/response memory coupled to each of the first and second devices to interlock the first and second devices for an exchange of information;

the first device operating to communicate to the second device, via the request/response memory, each request including request data and request ownership information being transmitted in a single write transaction to the request/response memory;

the second device operating to use the request data from each request as a lookup index to the lookup database for access to and retrieval of a corresponding one of the entries to generate a response including response data and response ownership information, and to communicate each response to the first device, via the request/response memory, for use by the first device in processing the input data;

the request/response memory comprising a plurality of entries, each of the entries including a request storage memory space for storing a request by the first device and a response storage memory space for storing a corresponding response by the second device;

the request storage memory space of each one of the entries including a first preselected memory location for storage of request ownership information and a second preselected memory location for storage of request data;

the response storage memory space of each one of the entries including a third preselected memory location for storage of response ownership information and a fourth preselected memory location for storage of response data;

wherein the request ownership information of the first preselected memory location indicates whether the request data stored in the respective request storage memory space by the first device is valid for use by the second device and the response ownership information of the respective third preselected memory location indicates whether the response data stored in the respective response memory space by the second device is valid for use by the first device;

wherein the first device operates to communicate each request in a single write transaction by simultaneously writing the request data and the request ownership information of the request being communicated in the request storage memory space of a preselected one of the entries, wherein the request ownership information of the request being communicated is written in the respective first preselected memory location to indicate that the corresponding request data simultaneously written in the respective second preselected memory location is valid;

wherein the second device polls and reads each request storage memory space and uses each valid request to access the information lookup database for a corresponding response, the second device writing ownership information in the respective first preselected space upon reading a request, to indicate that the corresponding request is now not valid, and storing each response in the response storage memory space of the preselected one of the entries storing the respective request, wherein storing each response includes writing ownership information in the respective third preselected memory location to indicate that the corresponding response is valid;

wherein each first preselected space stores ownership information comprising OWN_ID information and REQ_ID information;

the OWN_ID information representing one of a set state or a clear state, the set state indicating to the second device that a request stored in the respective request memory space is valid for use by the second device and the clear state indicating to the second device that a request stored in the respective request memory space is not valid for use by the second device;

the REQ_ID information representing one of a set state or a clear state, the state of the REQ_ID information being used by the second device to determine ownership information for writing in the third preselected space;

wherein the first device writes ownership information in a respective first preselected space by setting the OWN_ID information and writing REQ_ID information in a state that is opposite to the state of the REQ_ID information prior to the writing of ownership information by the first device.

10. The computer system of claim 9, wherein each third preselected space stores ownership information comprising RSP_ID information; the RSP_ID information representing one of a set state or a clear state, the state of the RSP_ID information written by the second device upon storing a response, being a state that matches the state of the REQ_ID information when the second device polls and reads the respective valid request.

11. The computer system of claim 10, wherein the first device reads the response memory storage space of each one of the preselected entries containing a request written by the first device, the response being valid for use by the first device when the state of the RSP_ID information in the third preselected space of the respective response memory space matches the state of the REQ_ID information written by the first device upon writing the corresponding request.

12. A computer system, which comprises:
a first device with means for receiving input data and means for generating requests for information relating to the input data, each request including request data and request ownership information;
a second device including an information lookup database comprising a plurality of entries, each one of the plurality of entries containing information relating to a corresponding request; and
a request/response memory coupled to each of the first and second devices to interlock the first and second devices for an exchange of information;
the first device operating to communicate to the second device, via the request/response memory, each request including request data and request ownership information being transmitted in a single write transaction to the request/response memory;
the second device operating to use the request data from each request as a lookup index to the lookup database for access to and retrieval of a corresponding one of the entries to generate a response including response data and response ownership information, and to communicate each response to the first device, via the request/response memory, for use by the first device in processing the input data;
the request/response memory comprising a plurality of entries, each of the entries including a request storage memory space for storing a request by the first device and a response storage memory space for storing a corresponding response by the second device;
the request storage memory space of each one of the entries including a first preselected memory location for storage of request ownership information and a second preselected memory location for storage of request data;
the response storage memory space of each one of the entries including a third preselected memory location for storage of response ownership information and a fourth preselected memory location for storage of response data;
wherein the request ownership information of the first preselected memory location indicates whether the request data stored in the respective request storage memory space by the first device is valid for use by the second device and the response ownership information of the respective third preselected memory location indicates whether the response data stored in the respective response memory space by the second device is valid for use by the first device;
wherein the first device operates to communicate each request in a single write transaction by simultaneously writing the request data and the request ownership information of the request being communicated in the request storage memory space of a preselected one of the entries, wherein the request ownership information of the request being communicated is written in the respective first preselected memory location to indicate that the corresponding request data simultaneously written in the respective second preselected memory location is valid;
wherein the second device polls and reads each request storage memory space and uses each valid request to access the information lookup database for a corresponding response, the second device writing ownership information in the respective first preselected space upon reading a request, to indicate that the corresponding request is now not valid, and storing each response in the response storage memory space of the preselected one of the entries storing the respective request, wherein storing each response includes writing ownership information in the respective third preselected memory location to indicate that the corresponding response is valid;
wherein the second device monitors the writing of requests by the first device and asserts a REQ_WIP signal when the first device is writing a request to the request/response memory;
wherein the second device, when the REQ_WIP signal is asserted, determines the preselected one of the entries being written by the first device, further determines if the preselected one of the entries being polled by the second device and suspends polling until the REQ_WIP signal is de-asserted when the preselected one of the entries is being polled by the second device.

13. An apparatus for interlocking two devices, which comprises:
a request/response memory for storage of requests from a first device and for storage of corresponding responses from a second device, each request including request data and request ownership information;
the request/response memory comprising a plurality of entries, each of the entries including a request storage memory space for storing a request including the request data and request ownership information, and a response storage memory space for storing a corresponding response including response data and response ownership information;

the request storage memory space of each one of the entries including a first preselected space for storage of the request ownership information which is accessible to both the first and second devices;

the response storage memory space of each one of the entries including a second preselected space for storage of the response ownership information;

wherein the request ownership information of the first preselected space indicates whether the request stored in the respective request storage memory space is valid and the response ownership information of the second preselected space indicates whether the response stored in the respective response memory space is valid.

14. The apparatus of claim 13, wherein each first preselected space stores ownership information comprising OWN_ID information and REQ_ID information;

the OWN_ID information representing one of a set state or a clear state, the set state indicating a request stored in the respective request memory space is valid and the clear state indicating that a request stored in the respective request memory space is not valid;

the REQ_ID information representing one of a set state and a clear state, the state of the REQ_ID information being stored in a state to match ownership information in the second preselected space when a response stored in the respective response memory space is valid and not to match the ownership information in the second preselected space when a response stored in the respective response memory space is not valid.

15. The apparatus of claim 14, wherein each second preselected space stores ownership information comprising RSP_ID information; the RSP_ID information representing one of a set state or a clear state, the state of the RSP_ID being a state that matches the state of the REQ_ID information when a response stored in the respective response memory space is valid and being a state that does not match the state of the REQ_ID information when a response stored in the respective response memory space is not valid.

16. A device for processing data as a function of information relating to the data, the information relating to the data being external to the device, the device comprising:

means for generating requests for information relating to the data wherein each request includes request data and request ownership information; and means for writing each request to a preselected one of a set of entries of a request/response memory at a memory location accessible to a device for responding to each request;

the means for generating the request ownership information to include OWN_ID information and REQ_ID information so that the OWN_ID information represents one of a first state or a second state, the first state indicating that the respective request is valid for use and the second state indicating that the respective request is not valid for use, and the REQ_ID information represents one of a first state and a second state;

the means for generating requests setting, in each request, when generating the respective request, the OWN_ID information to be in the first state and the REQ_ID information to be in one of the first state and the second state as a function of a present state of the REQ_ID information in the respective preselected one of the set of entries to which the means for writing writes the respective request.

17. A device for processing requests including request data and request ownership information from at least one other device to obtain corresponding responses for return to the at least one other device, the at least one other device writing the requests into preselected ones of a set of entries of a request/response memory, the request ownership information of each request including REQ_ID information representing one of a first state or a second state, the device comprising:

means for reading each request from the preselected ones of the set of entries;

means for processing each request to obtain a corresponding response including response data and response ownership information;

means for setting the response ownership information for the response, the ownership information comprising RSP_ID information representing one of a first state and a second state; and means for writing the response including the respective RSP_ID information to a preselected one of the set of entries corresponding to the respective request in a single write transaction, the preselected one of the set of entries being accessible to the at least one other device;

the means for setting operating to set the RSP_ID information, prior to writing the RSP_ID information, to one of the first state and the second state as a function of the state of the REQ_ID information written to the preselected one of the set of entries by the at least one other device.

18. A computer system, which comprises:

a first device for processing data and generating requests for information relating to the data, each request including request data and request ownership information;

a second device for processing the requests for information; and a request/response memory coupled to each of the first and second devices to interlock the first and second devices for an exchange of information;

the first device operating to communicate to the second device, via the request/response memory, the requests for information relating to data processed at the first device;

the second device operating to process each request to provide a response including response data and response ownership information and to communicate each response to the first device, via the request/response memory, for use by the first device in processing the data;

the request/response memory comprising a plurality of entries, each of the entries including a request storage memory space for storing a request by the first device and a response storage memory space for storing a corresponding response, the request storage memory space for each entry being accessible to both the first and second devices;

the request storage memory space of each one of the entries including a first preselected space for storage of the request ownership information included in each request;

the response storage memory space of each one of the entries including a second preselected space for storage of the response ownership information included in each response;

wherein the request ownership information of the first preselected space indicates whether the request stored in the respective request storage memory space by the first device is valid for use by the second device and the response ownership information of the second preselected space indicates whether the response stored in the respective response memory space by the second device is valid for use by the first device.

19. The computer system of claim 18 wherein the first device operates to communicate each request by simultaneously writing the request data of each request in the request storage memory space of a preselected one of the entries and the request ownership information in the respective first preselected space to indicate that the corresponding request is valid.

20. The computer system of claim 19 wherein the second device polls and reads each request storage memory space and processes each valid request to obtain a corresponding response, the second device writing ownership information in the respective first preselected space upon reading a request, to indicate that the corresponding request is now not valid, and storing each response in the response storage memory space of the preselected one of the entries storing the respective request and writing ownership information in the respective second preselected space to indicate that the corresponding response is valid.

21. The computer system of claim 20, wherein each first preselected space stores request ownership information comprising OWN_ID information and REQ_ID information;
   the OWN_ID information representing one of a first state or a second state, the first state indicating to the second device that request data stored in the respective request memory space is valid for use by the second device and the second state indicating to the second device that request data stored in the respective request memory space is not valid for use by the second device;
   the REQ_ID information representing one of a first state and a second state, the state of the REQ_ID information being used by the second device to determine ownership information for writing in the second preselected space.

22. The computer system of claim 20, wherein the second device monitors the writing of requests by the first device and asserts a REQ_WIP signal when the first device is writing a request to the request/response memory.

23. The computer system of claim 18, further comprising a plurality of additional devices, each operating to generate requests for information and being coupled to the request/response memory.

24. The computer system of claim 23, wherein the entries are grouped into a preselected number of rings; with each one of the entries being grouped into one of the rings and each ring being dedicated for use by one of the first device and the plurality of additional devices.

25. The computer system of claim 18, wherein the request/response memory comprises a RAM.

26. A computer system, which comprises:
   a first device for processing data and generating requests for information relating to the data, each request including request data and request ownership information;
   a second device for processing the requests for information;
   a request/response memory coupled to each of the first and second devices to interlock the first and second devices for an exchange of information;
   the first device operating to communicate to the second device, via the request/response memory, the requests for information relating to data processed at the first device;
   the second device operating to process each request to provide a response including response data and response ownership information and to communicate each response to the first device, via the request/response memory, for use by the first device in processing the data;
   the request/response memory comprising a plurality of entries, each of the entries including a request storage memory space for storing a request by the first device and a response storage memory space for storing a corresponding response;
   the request storage memory space of each one of the entries including a first preselected space for storage of the request ownership information included in each request;
   the response storage memory space of each one of the entries including a second preselected space for storage of the response ownership information included in each response;
   wherein the request ownership information of the first preselected space indicates whether the request stored in the respective request storage memory space by the first device is valid for use by the second device and the response ownership information of the second preselected space indicates whether the response stored in the respective response memory space by the second device is valid for use by the first device;
   wherein the first device operates to communicate each request by simultaneously writing the request data of each request in the request storage memory space of a preselected one of the entries and the request ownership information in the respective first preselected space to indicate that the corresponding request is valid;
   wherein the second device polls and reads each request storage memory space and processes each valid request to obtain a corresponding response, the second device writing ownership information in the respective first preselected space upon reading a request, to indicate that the corresponding request is now not valid, and storing each response in the response storage memory space of the preselected one of the entries storing the respective request and writing ownership information in the respective second preselected space to indicate that the corresponding response is valid;
   wherein each first preselected space stores request ownership information comprising OWN_ID information and REQ_ID information;
   the OWN_ID information representing one of a first state or a second state, the first state indicating to the second device that request data stored in the respective request memory space is valid for use by the second device and the second state indicating to the second device that request data stored in the respective request memory space is not valid for use by the second device;
   the REQ_ID information representing one of a first state and a second state, the state of the REQ_ID information being used by the second device to determine ownership information for writing in the second preselected space;
   wherein the first device writes ownership information in a respective first preselected space by setting the OWN_ID information to the first state and writing REQ_ID information in a state that is opposite to the state of the REQ_ID information prior to the writing of ownership information by the first device.

27. The computer system of claim 26, wherein each second preselected space stores ownership information comprising RSP_ID information; the RSP_ID information representing one of a first state or a second state, the state of the RSP_ID information written by the second device upon storing a response, being a state that matches the state of the REQ_ID information when the second device polls and reads the respective valid request.

28. The computer system of claim 27, wherein the first device reads the response memory storage space of each one of the preselected entries containing a request written by the first device, the response being valid for use by the first device when the state of the RSP_ID information in the second preselected space of the respective response memory space matches the state of the REQ_ID information written by the first device upon writing the corresponding request.

29. A computer system, which comprises:
   a first device for processing data and generating requests for information relating to the data, each request including request data and request ownership information;
   a second device for processing the requests for information; and
   a request/response memory coupled to each of the first and second devices to interlock the first and second devices for an exchange of information;
   the first device operating to communicate to the second device, via the request/response memory, the requests for information relating to data processed at the first device;
   the second device operating to process each request to provide a response including response data and response ownership information and to communicate each response to the first device, via the request/response memory, for use by the first device in processing the data;
   the request/response memory comprising a plurality of entries, each of the entries including a request storage memory space for storing a request by the first device and a response storage memory space for storing a corresponding response;
   the request storage memory space of each one of the entries including a first preselected space for storage of the request ownership information included in each request;
   the response storage memory space of each one of the entries including a second preselected space for storage of the response ownership information included in each response;
   wherein the request ownership information of the first preselected space indicates whether the request stored in the respective request storage memory space by the first device is valid for use by the second device and the response ownership information of the second preselected space indicates whether the response stored in the respective response memory space by the second device is valid for use by the first device;
   wherein the first device operates to communicate each request by simultaneously writing the request data of each request in the request storage memory space of a preselected one of the entries and the request ownership information in the respective first preselected space to indicate that the corresponding request is valid;
   wherein the second device polls and reads each request storage memory space and processes each valid request to obtain a corresponding response, the second device writing ownership information in the respective first preselected space upon reading a request, to indicate that the corresponding request is now not valid, and storing each response in the response storage memory space of the preselected one of the entries storing the respective request and writing ownership information in the respective second preselected space to indicate that the corresponding response is valid;
   wherein the second device monitors the writing of requests by the first device and asserts a REQ_WIP signal when the first device is writing a request to the request/response memory;
   wherein the second device, when the REQ_WIP signal is asserted, determines the preselected one of the entries being written by the first device, further determines if the preselected one of the entries is being polled by the second device and suspends polling until the REQ_WIP signal is de-asserted when the preselected one of the entries is being polled by the second device.

30. A method of generating and transmitting a request for information to a request/response memory, the request including request data and request ownership information, the request/response memory including a set of entries for the storage of requests, the method comprising the steps of:
   for each request, generating request data and request ownership information, the request ownership information comprising OWN_ID information and REQ_ID information so that the OWN_ID information represents one of a first state or a second state, the first state indicating that the respective request data is valid for use and the second state indicating that the respective request data is not valid for use, and the REQ_ID information represents one of a first state and a second state;
   during the step of generating the request ownership information for the respective request, setting the ownership information so that the OWN_ID information is in the first state and the REQ_ID information is in one of the first state or the second state as a function of a present state of REQ_ID information in a preselected one of the set of entries of the request/response memory; and
   transmitting each request including the corresponding request data and request ownership information to the request/response memory for simultaneous writing of the request data and the corresponding request ownership information into the respective preselected one of the entries, the respective preselected one of the entries being accessible to a device for responding to the request.

31. A method of processing requests for information, the requests being stored in preselected ones of a set of entries in a request/response memory and each request including request data and REQ_ID information representing one of a first state and a second state, the method comprising the steps of:
   reading each request from the preselected ones of the set of entries;
   processing each request to obtain a corresponding response including response data and response ownership information;
   for each response, generating response ownership information relating to the response data, the ownership information comprising RSP_ID information representing one of a first state or a second state; and writing the response data and the respective RSP_ID information to a preselected one of the set of entries corresponding to the respective request, the preselected one of the set of entries being accessible to a device for responding to the request;

wherein the step of generating the RSP_ID information is carried out prior to writing the response data and the RSP_ID information, to set the RSP_ID information to one of the first state and the second state as a function of a present state of the REQ_ID information in the respective preselected one of the set of entries.

32. A method for communicating a request and a corresponding response between two operating devices, the method comprising the steps of:

providing a request/response memory for storage of requests from a first operating device and for storage of corresponding responses from a second operating device, the request/response memory comprising a plurality of entries, each of the entries including a request storage memory space for storing a request including request data and request ownership information and a response storage memory space for storing a corresponding response including response data and response ownership information;

operating the first device, for each request:
  i. to generate request data information;
  ii. to generate request ownership information comprising OWN_ID information and REQ_ID information so that the OWN_ID information represents one of a first state or a second state, the first state indicating that the respective request is valid for use and the second state indicating that the respective request is not valid for use, and the REQ_ID information represents one of a first state or a second state;
  iii. during the operation of the first device to generate the request ownership information for the respective request, to set the ownership information so that the OWN_ID information is in the first state and the REQ_ID information is in one of the first state and the second state as a function of a present state of REQ_ID information in the request storage memory space of a preselected one of the entries of the request/response memory; and
  iii. to transmit each request including the request data information and the corresponding request ownership information to the request/response memory for simultaneous writing of the request data information and the corresponding request ownership information into the request storage memory space of the respective preselected one of the entries; and operating the second device, for each request:
  i. to read request from the preselected ones of the entries;
  ii. to process request to obtain a corresponding response including response data and response ownership information;
  iii for each response, to generate the response ownership information relating to the response, the ownership information comprising RSP_ID information representing one of a first state or a second state; and
  iv. to write the response including and the response ownership information including the respective RSP_ID information to the response storage memory space of the preselected one of the entries corresponding to the respective request, the response storage memory space of the preselected one of the entries being accessible to the first device;
  v. the operation of the second device to generate the RSP_ID information being carried out prior to writing the RSP_ID information and the corresponding response, to set the RSP_ID information to one of the first state or the second state as a function of the state of the REQ_ID information written by the first device when writing the corresponding request to the request storage memory space of the respective preselected one of the entries.

* * * * *